United States Patent
Lipman et al.

(12) 
(10) Patent No.: US 6,270,013 B1
(45) Date of Patent: Aug. 7, 2001

(54) HAND-HOLDABLE OPTICAL SCANNER PARTICULARLY USEFUL AS ELECTRONIC TRANSLATOR

(75) Inventors: Adi Lipman; Aharon Lipman, both of Michmoret (IL)

(73) Assignee: Wizcom Technologies, Ltd., Jerusalem (IL)

( * ) Notice: Subject to any disclaimer, the term of this patent is extended or adjusted under 35 U.S.C. 154(b) by 0 days.

(21) Appl. No.: 09/230,325

(22) PCT Filed: Jul. 14, 1997

(86) PCT No.: PCT/IL97/00238

§ 371 Date: Apr. 19, 1999

§ 102(e) Date: Apr. 19, 1999

(87) PCT Pub. No.: WO98/03932

PCT Pub. Date: Jan. 29, 1998

(30) Foreign Application Priority Data

Jul. 22, 1996 (IL) .................................................. 118914

(51) Int. Cl.$^7$ ................................. G06K 7/10; G06K 7/14
(52) U.S. Cl. ............... 235/454; 235/472.01; 235/462.45; 359/833
(58) Field of Search .................................... 359/726, 833, 359/834, 835, 836; 358/473; 382/312, 364; 235/454, 472.01, 472.02, 462.45, 462.46, 462.49

(56) References Cited

U.S. PATENT DOCUMENTS

| 3,541,248 | 11/1970 | Young . |
| 3,703,330 | * 11/1972 | Allen .................................... 350/157 |
| 3,767,938 | 10/1973 | Kueper . |
| 3,869,599 | 3/1975 | Sansone . |
| 4,157,236 | 6/1979 | Busker . |
| 4,195,904 | * 4/1980 | Yamashita ............................... 350/68 |
| 4,349,730 | * 9/1982 | Pfeifer et al. ......................... 235/472 |
| 4,539,475 | * 9/1985 | Bosse .................................... 250/231 |
| 4,574,317 | 3/1986 | Scheible . |
| 4,701,804 | 10/1987 | Toyoda et al. . |

(List continued on next page.)

FOREIGN PATENT DOCUMENTS

| 2 014 765 | 8/1979 | (GB) . |
| 2 288 512 | 10/1995 | (GB) . |
| 61-16671 | * 1/1986 | (JP) . |
| 61-67365 | * 4/1986 | (JP) . |
| 62-51365 | * 3/1987 | (JP) . |
| 62-115970 | * 5/1987 | (JP) . |
| 61-150564 | * 7/1987 | (JP) . |
| 63-30064 | * 2/1988 | (JP) . |
| 63-128865 | * 6/1988 | (JP) . |
| 63-181563 | * 7/1988 | (JP) . |
| 63-204864 | * 8/1988 | (JP) . |
| 63-292760 | * 11/1988 | (JP) . |
| 8-107479 | 4/1996 | (JP) . |
| 8-107480 | 4/1996 | (JP) . |
| 9-312738 | 12/1997 | (JP) . |
| 9-312739 | 12/1997 | (JP) . |
| 9-321944 | 12/1997 | (JP) . |
| 9-321950 | 12/1997 | (JP) . |
| WO 98/20446 | 5/1998 | (WO) . |

OTHER PUBLICATIONS

Israel Patent Application No. . 114367.

*Primary Examiner*—Karl D. Frech
*Assistant Examiner*—Daniel St. Cyr
(74) *Attorney, Agent, or Firm*—Pillsbury Winthrop LLP

(57) ABSTRACT

An optical scanner including a scanner head, a roller engaged by a record, the roller including optically readable marks, light sources and sensor which illuminate and sense both roller and the record, a lens for focusing light from the record onto the sensor, and a lens mirror for focusing light from the roller onto the sensor.

10 Claims, 9 Drawing Sheets

U.S. PATENT DOCUMENTS

| | | | |
|---|---|---|---|
| 4,716,291 | * | 12/1987 | Sakamoto et al. .................... 250/318 |
| 4,793,812 | | 12/1988 | Sussman et al. . |
| 4,901,163 | | 2/1990 | Tsujioka . |
| 4,906,843 | | 3/1990 | Jones et al. . |
| 4,947,261 | * | 8/1990 | Ishikawa et al. .................... 358/473 |
| 5,012,349 | | 4/1991 | de Fay . |
| 5,095,389 | * | 3/1992 | Yokomori ............................ 359/833 |
| 5,111,005 | * | 5/1992 | Smith et al. ............................ 178/19 |
| 5,142,161 | | 8/1992 | Brackmann . |
| 5,227,909 | * | 7/1993 | Watson ................................ 359/196 |
| 5,306,908 | * | 4/1994 | McConica et al. .................. 250/234 |
| 5,321,548 | * | 6/1994 | Takase ................................ 359/431 |
| 5,371,347 | | 12/1994 | Plesko . |
| 5,381,020 | * | 1/1995 | Kochis et al. ....................... 250/566 |
| 5,506,394 | | 4/1996 | Plesko . |
| 5,517,407 | | 5/1996 | Weiner . |
| 5,550,362 | | 8/1996 | Sherman . |
| 5,574,804 | * | 11/1996 | Olschafskie et al. ................ 382/313 |
| 5,623,285 | * | 4/1997 | Aharonson et al. ................. 345/168 |
| 5,638,466 | * | 6/1997 | Rokusek .............................. 382/290 |
| 5,648,760 | | 7/1997 | Kumar . |
| 5,963,343 | * | 10/1999 | Kubo et al. .......................... 358/473 |
| 5,974,204 | * | 10/1999 | Lin et al. ............................. 382/314 |
| 5,988,900 | * | 11/1999 | Bobry .................................... 400/88 |
| 5,999,666 | * | 12/1999 | Gobeli et al. ........................ 382/313 |
| 6,005,681 | * | 12/1999 | Pollard ................................. 358/473 |
| 6,036,094 | * | 3/2000 | Goldman et al. ............... 235/462.45 |
| 6,036,095 | * | 3/2000 | Seo ................................. 235/472.01 |

\* cited by examiner

HAND-HOLDABLE OPTICAL SCANNER PARTICULARLY USEFUL AS ELECTRONIC TRANSLATOR

This application is the national phase of international application PCT/IL97/00238 filed Jul. 14, 1997 which designated the U.S.

BACKGROUND OF THE INVENTION

The present invention relates to hand-holdable optical scanners for scanning record media. The invention is particularly useful in the optical scanner described in our Israel Patent Application No. 114,367 filed Jun. 27, 1995, and is therefore described below with respect to that application.

Our Israel Patent Application 114,367 describes a hand-holdable optical scanner for scanning printed text on record media and for simultaneously translating the words from one language into another, or from one definition to another in the same language. Critical requirements of such an optical scanner include compactness in construction and reliability in operation.

SUMMARY OF THE INVENTION

An object of the present invention is to provide an optical scanner which enables the scanner to be constructed very compactly, thereby making the optical scanner particularly useful, among other applications, as a hand-holdable electronic translator.

According to one aspect of the present invention, there is provided an optical scanner comprising a hand-holdable housing including: a scanner head for scanning a record medium; a roller engageable and rotated by the record medium when scanned by the scanner head, the roller including an optically-sensible marking for use in measuring the rotary movements of the roller; illuminating means for illuminating the record medium and the roller including the marking thereon; an optical sensor for sensing information on the record medium and the markings on the roller and for producing an output corresponding thereto; a first optical system including a focusing lens for focusing light reflected from the record medium onto the optical sensor; and a second optical system for focusing light reflected from the roller onto the optical sensor; the second optical system including the focusing lens of the first optical system but located at a shorter distance from the roller than from the record member; the second optical system further including a lens-mirror member having: a first face facing the focusing lens for receiving light therefrom reflected by the roller; a second face facing the optical sensor for transmitting light exiting from the lens-mirror member to the optical sensor; and a third, reflecting face for receiving the incoming light from the first face and for reflecting same through the second face to the optical sensor; at least one of the faces being light-converging to partially focus the received light such as to compensate for the shorter distance between the focal lens and the roller than between the focal lens and the record member.

The foregoing features enable the optical scanner to be constructed very compactly, more compactly than that described, for example, in our above-cited Israel Patent Application 114,367, since the single lens-mirror member used in the novel construction of the present application replaces two spaced-apart mirrors in the construction described in that patent application.

In the preferred embodiment of the invention described in the present application, the first face is the light-converging face, the reflecting face is planar, and the second face is also planar and is inclined so as to be substantially normal to the light received from the roller and reflected by the reflecting face through the second face.

According to an additional aspect of the present invention, the housing further includes an optical light guide for guiding the movement of the scanner head over the record medium, the optical light guide comprising a light source for projecting light laterally of the housing in the direction of movement of the scanner head over the record medium. In one described embodiment, the optical light guide further comprises a mirror within the housing for projecting a beam of light laterally through an opening in the housing in the direction of movement of the scanner head over the record medium. In a second described embodiment, the optical light guide further comprises a transparent guide member fixed to the housing; the transparent guide member having an inner surface exposed to the light of the light source within the housing, and an outer surface projecting outwardly of the housing in the direction of movement of the scanner head over the record medium.

According to a still further aspect of the invention, there is provided an optical scanner comprising a hand-holdable housing including: a scanner head for scanning a record medium; an optical sensor for sensing information on the record medium and for producing an output corresponding thereto; and a data processor for processing the output of the optical sensor; the data processor being programmed to first measure the output of the optical sensor when the scanner head is out of contact with the record medium to assure the output is below a first predetermined threshold, and then to measure the output of the optical scanner when the scanner head is in contact with the record medium to assure that the output is above a second predetermined threshold, before it processes the output of the optical sensor.

The foregoing features may advantageously be used in optical scanners for a wide variety of applications, but are particularly useful in hand-holdable electronic translators.

Further features and advantages of the invention will be apparent from the description below.

The invention is herein described, by way of example only, with reference to the accompanying drawings, wherein:

Figure 8:
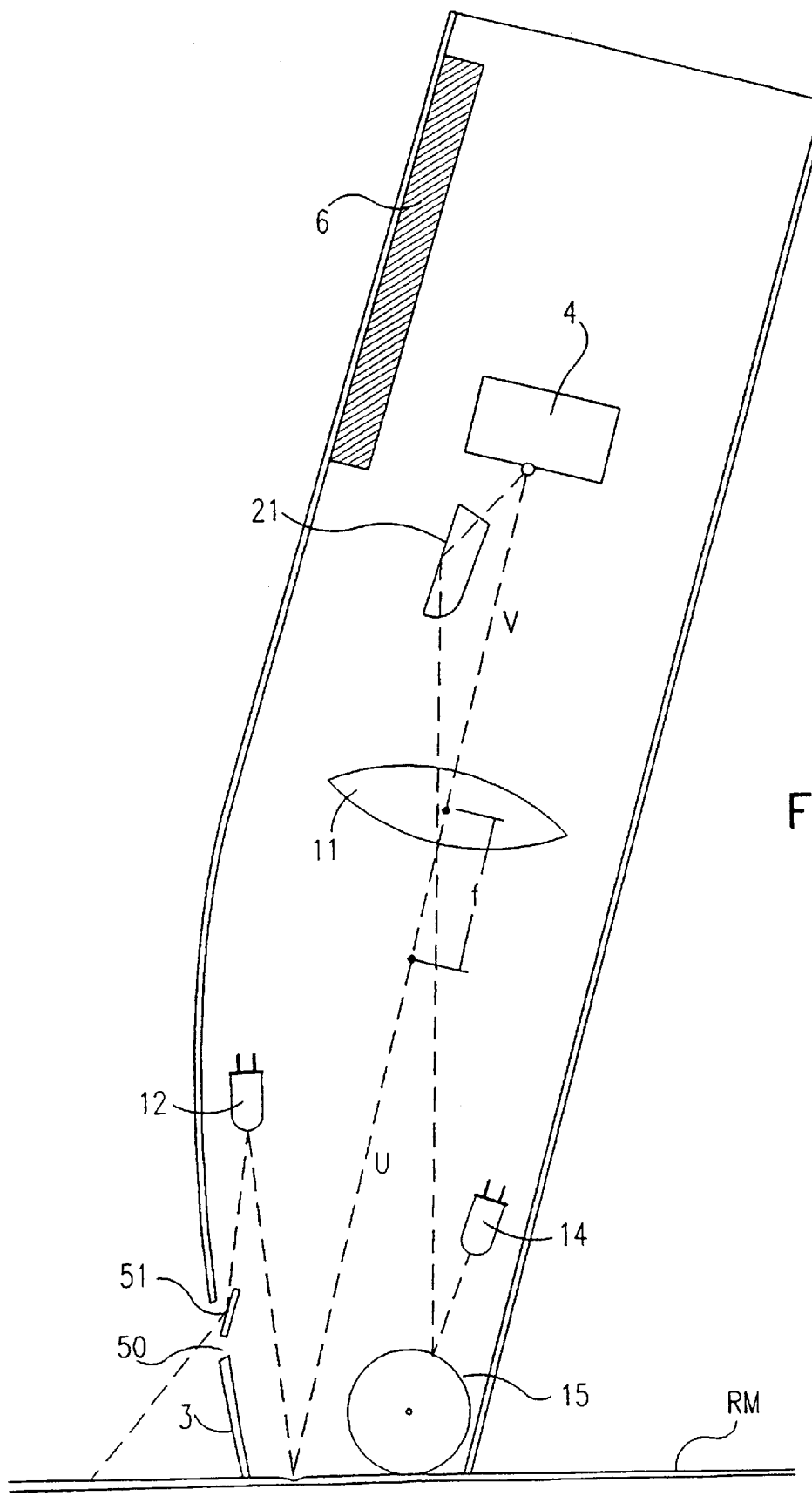
FIG. 8 is a diagrammatic view illustrating a modification in the construction of the optical scanner of FIGS. 1 and 2 for purposes of incorporating an optical light guide to guide the movement of the scanner over the record medium.
Figure 9:
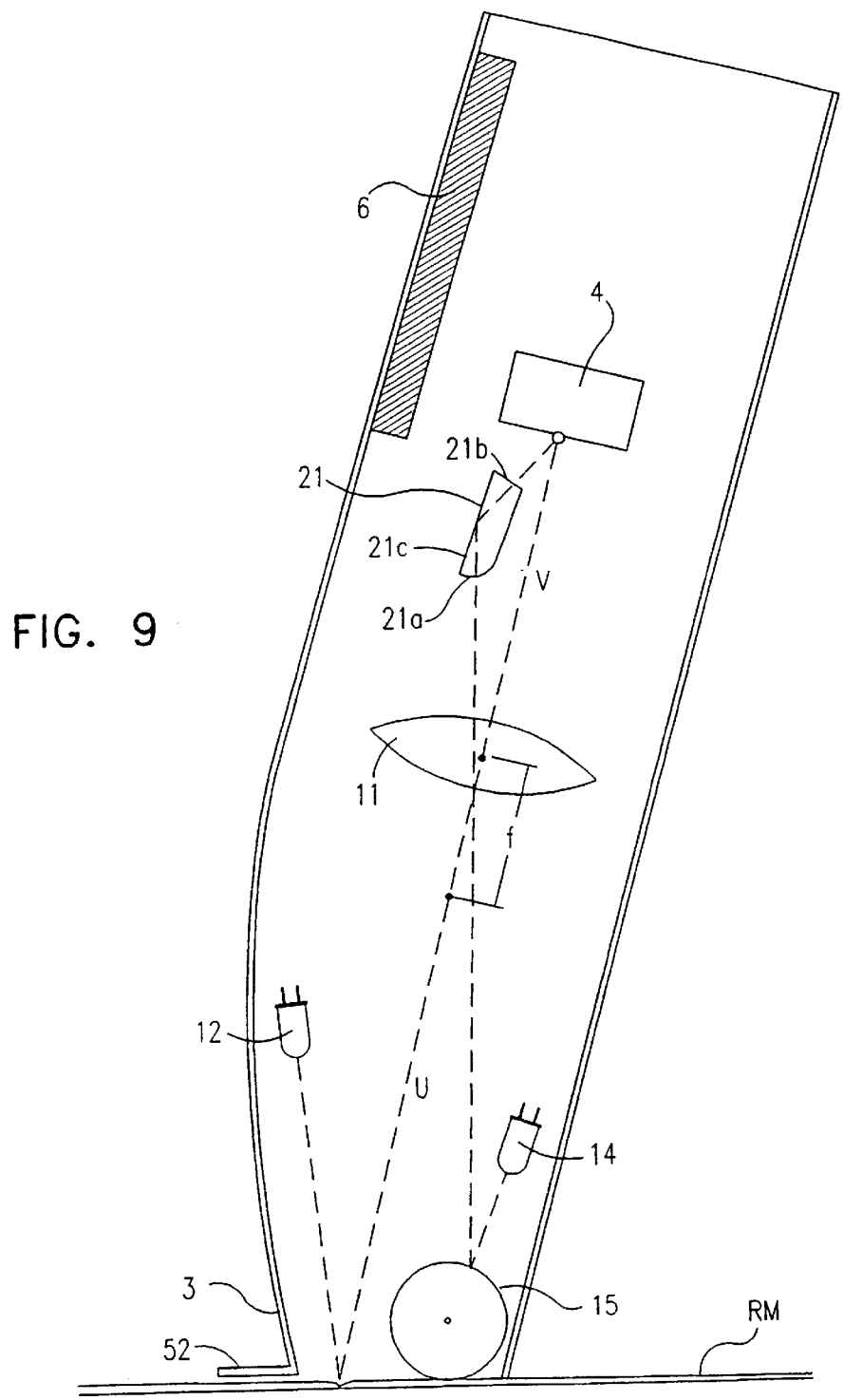
Figure 10:
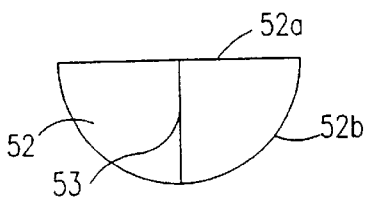

FIG. 9 is a view corresponding to that of FIG. 8 but illustrating a modification in the construction of the optical light guide;

FIG. 10 is a top plan view of a transparent member in the guide of FIG. 9; and

Figure 11:
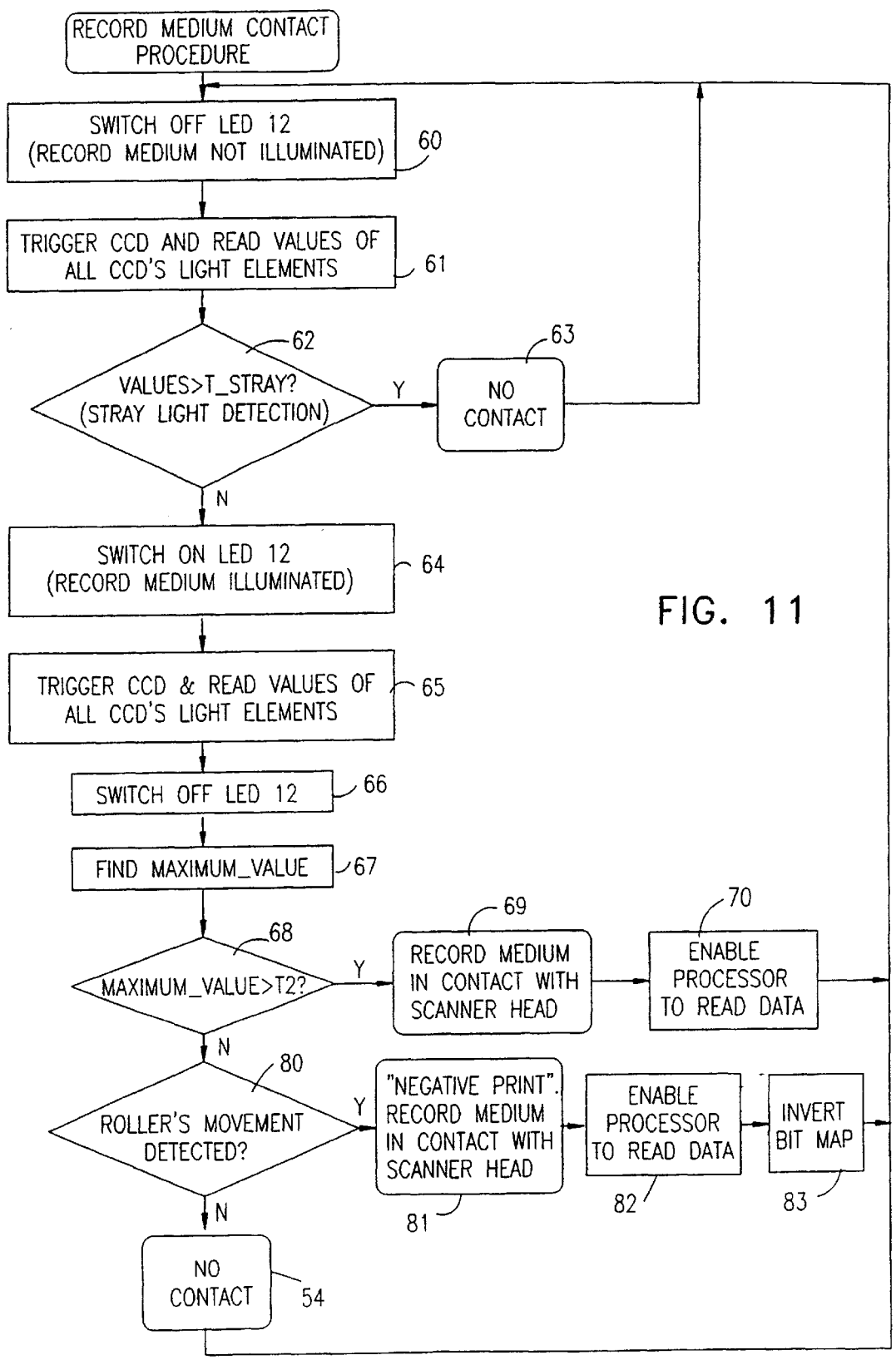

FIG. 11 is a flow chart illustrating a procedure for detecting the contacting and the proper positioning of the optical scanner with respect to the record medium being scanned.

DETAILED DESCRIPTION OF THE PREFERRED EMBODIMENT

Figure 1:
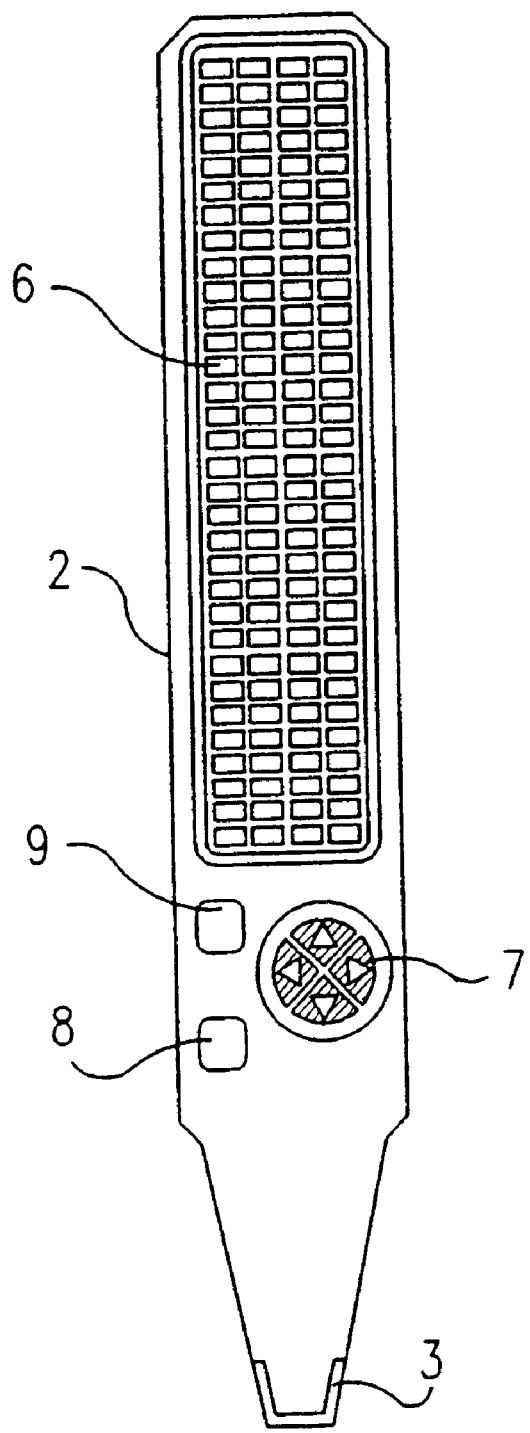
FIG. 1 is a pictorial illustration of one form of hand-holdable optical scanner constructed in accordance with the present invention.
Figure 2:
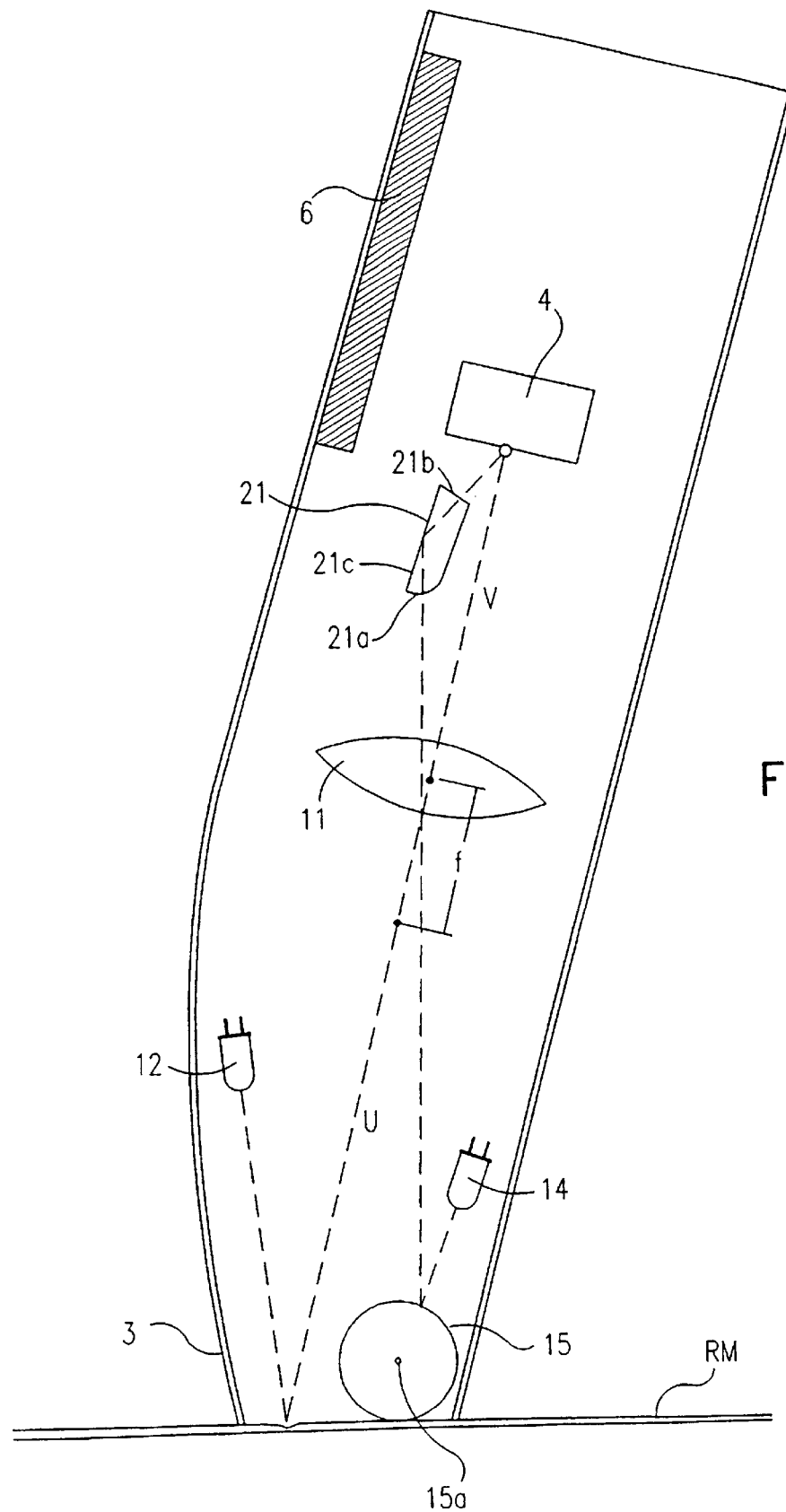
FIG. 2 is a diagrammatic view more particularly illustrating the internal construction of the optical scanner of FIG. 1.
Figure 3:
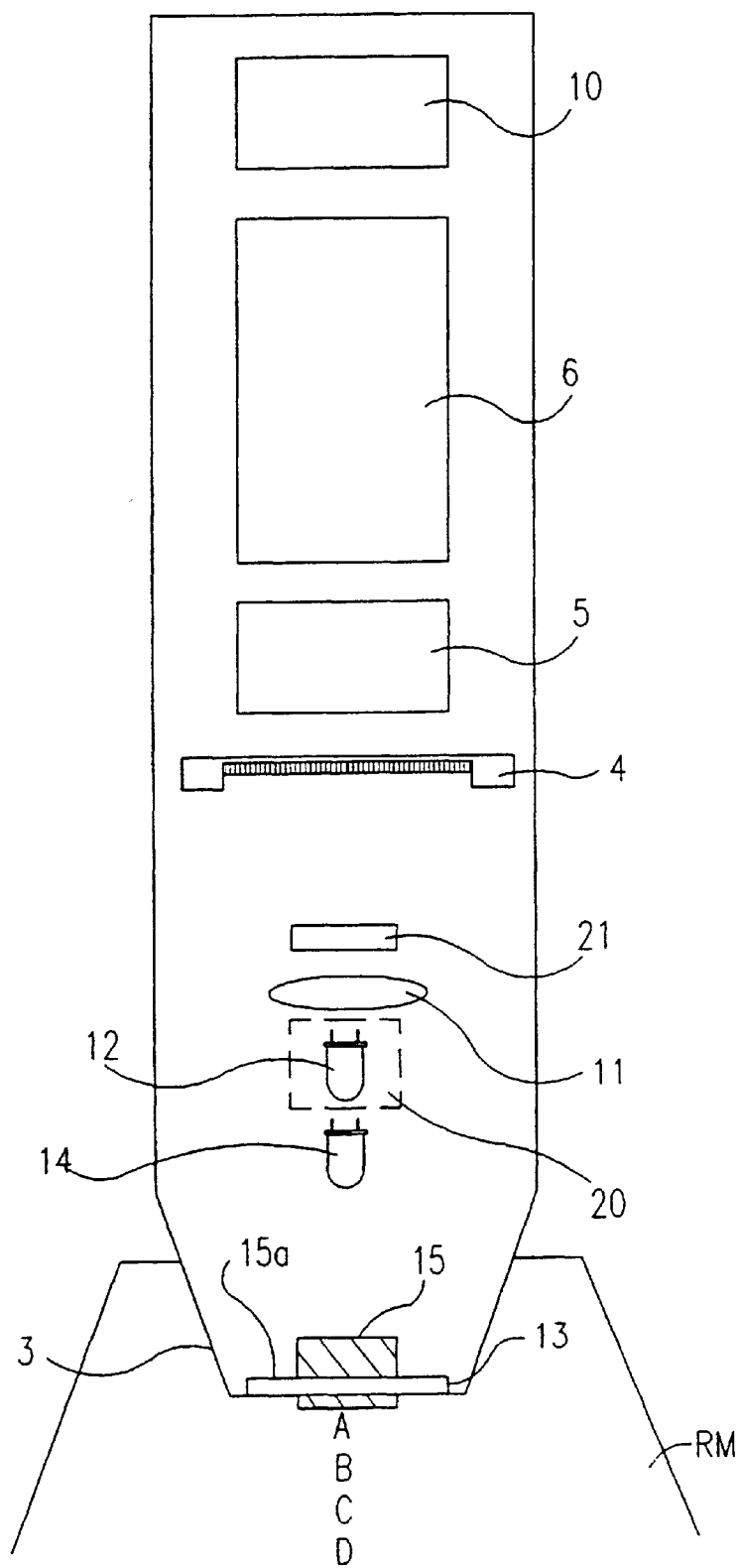
FIG. 3 is a diagrammatic front view illustrating the internal construction of the optical scanner of FIGS. 1 and 2.

The electronic translator illustrated in FIGS. 1–3 of the drawings comprises a hand-holdable housing 2 including a scanner head 3 at one end for scanning a record medium, such as a printed text. An optical sensor, generally designated 4, is enclosed within housing 2 for sensing characters printed on a record medium RM scanned by the scanner head 3 and for converting them to electrical signals. Housing 2 also contains electrical circuitry, schematically indicated by block 5 in FIG. 3, which includes a storage device for storing a dictionary of words in one language and their translations in another language. Housing 2 further carries a visual display 6 for displaying the translations of scanned words. Electrical circuitry 5 within the housing includes, in addition to the mentioned storage device, also a data processor for processing the electrical signals from the optical sensor 4, for recognizing words therefrom corresponding to words stored in the storage device, and for displaying their translations in the visual display 6.

Housing 2 further includes four directional keys, generally designated 7, for scrolling the words reproduced on the visual display 6; an ON/OFF key 8 for energizing the scanner and for deenergizing it; and an Enter key 9 for entering a word. Enter key 9 may also function as a Continuation key, to be depressed when a word on one line is continued on a second line. The four directional keys 7 may be used for centering the words reproduced in the visual display 6, such that after a scanned word is centered in the display, the Enter key 9 is depressed to display the translation. Enter key 7 may also be used as a cursor to select a translation.

The scanner is powered by its own self-contained battery power supply, schematically shown at 10 in FIG. 3.

The optical sensor 4 is constituted of a plurality of optical sensing elements arranged in a linear array perpendicular to the direction of movement of the scanner head 3. In the example described below, it is a single linear CCD array of 64 pixels having a length of about 8 mm, and is used in three separate systems of the scanner: (1) a character detector system, for detecting the characters scanned by the scanner head; (2) a displacement detector system, for detecting the displacement or movement of the scanner head over the record medium; and (3) a record medium detector system, for detecting the proper positioning of the scanner head in contact with the record medium RM. The images produced by all three systems are focused by a common focusing lens 11 on the CCD array 4.

The character detector system includes a light source 12 for projecting a beam of light onto the field of view of the record medium RM as it is scanned by the scanner head 3. This light is reflected by the record medium RM back into the housing 2 and is focused by focusing lens 11 onto the CCD array 4. In order to prevent interference from visible light externally of the housing, light source 12 is preferably a red LED.

The displacement detector system for detecting the displacement of the scanner head along the record medium RM includes a second light source 14 which projects its light onto a roller 15 engageable with the record medium RM, and rotated thereby as the scanner head 3 is moved along the record medium. Roller 15 is mounted for rotation about an axis 15a parallel to the CCD array 4, i.e., perpendicular to the direction of movement of the scanner head 3 along the record medium RM. This roller is provided with optically discernible markings 16 effective to reflect light from light source 14 onto the CCD array 4 corresponding to the rotary movements of the roller.

Figure 4:
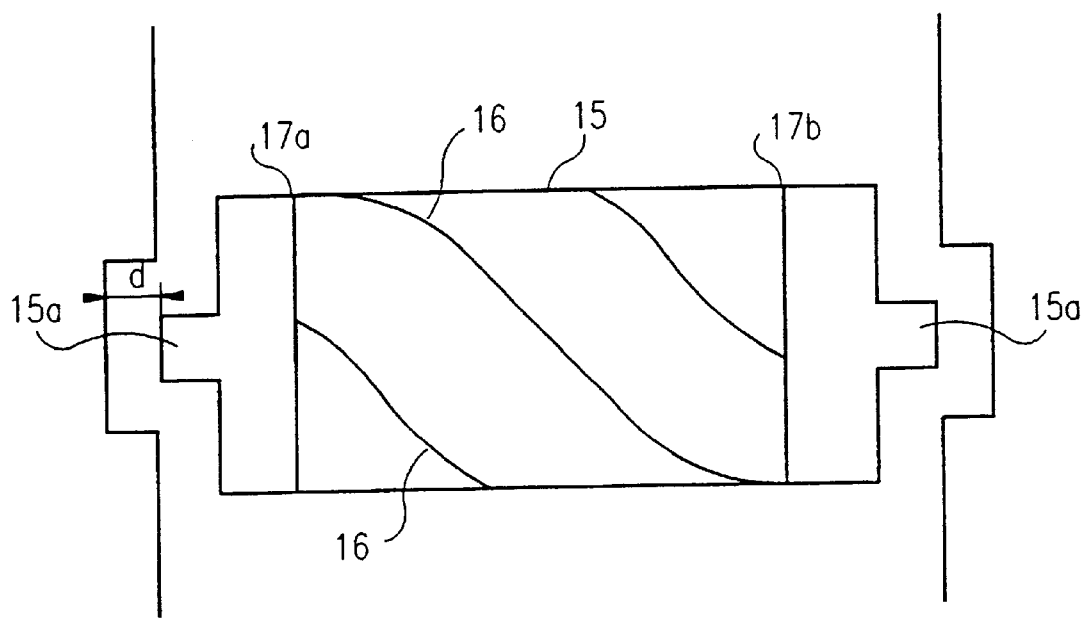
FIG. 4 is a side elevational view of the roller in the optical scanner of FIG. 3.

Roller 15 carries five lines 16 each extending helically, between preferably two reference lines 17a, 17b, for a fraction of the circumference of the roller and equally spaced from each other circumferentially of the roller. Alternatively, it is possible to use one reference line on the roller 15. In FIG. 4 three of the lines 16 are shown; the remaining two lines are located on the rear side of the roller 15 and are not visible in the present orientation of roller 15. The two reference lines 17a, 17b extend around the complete circumference of the roller at the opposite ends of the helical lines 16. The outer surface of the roller 15 is black, but the lines 16, 17a, 17b are white, or vice versa, so as to be visually discernible. Each helical line 16 extends for substantially one-fifth the circumference of the roller, preferably slightly more than one-fifth to provide a small overlap.

Light source 14 is preferably a source of visible light. It is projected onto the outer surface of roller 15 such that light will be reflected only from the helical lines 16 and the reference lines 17a, 17b. Thus as the roller rotates, a spot of light reflected from helical lines 16 moves along the pixels of the CCD array 4 such that the pixels illuminated by this moving spot of light track the displacement of the roller as the scanner head is moved across the record medium RM.

Since spots of light are also reflected from the reference lines 17a, 17b, the number of sensor elements spanned can be calculated and used to track the exact displacement position of the roller.

Due to the mechanical construction of the roller 15, rotation of the roller 15 may cause sideways movement of the roller 15 through a small distance "d", as illustrated in FIG. 4. This sideways movement of the roller 15 is compensated for by detecting the reflected light between the two reference lines 17a and 17b.

As indicated earlier, focusing lens 11 is used both in the optical system for focusing light reflected from the record medium RM onto the CCD array 4, and also in the optical system for focusing light reflected from the roller 15 onto the CCD array 4. Since:

$$1/f = 1/u + 1/v$$

(wherein "f" is the lens focal length, "u" is the lens distance to the object, and "v" is the length distance to the CCD array) must be the same for both optical paths, and since roller 15 is closer than the record medium RM to the lens 11, the optical path from the lens to the CCD array 4 for the light reflected from the roller must be increased.

This is accomplished in a very compact manner by the provision of a lens-mirror member 21 in the roller optical path between the lens 11 and the CCD array 4.

Figure 5:
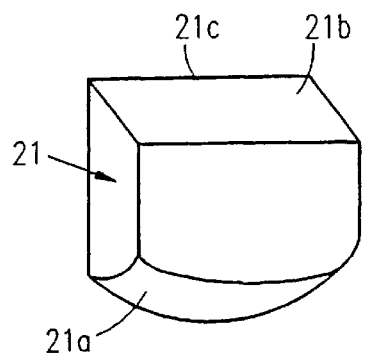
FIG. 5 is a three-dimensional view of the lens-mirror member included in the optical scanner of FIGS. 1 and 2.
Figure 6:
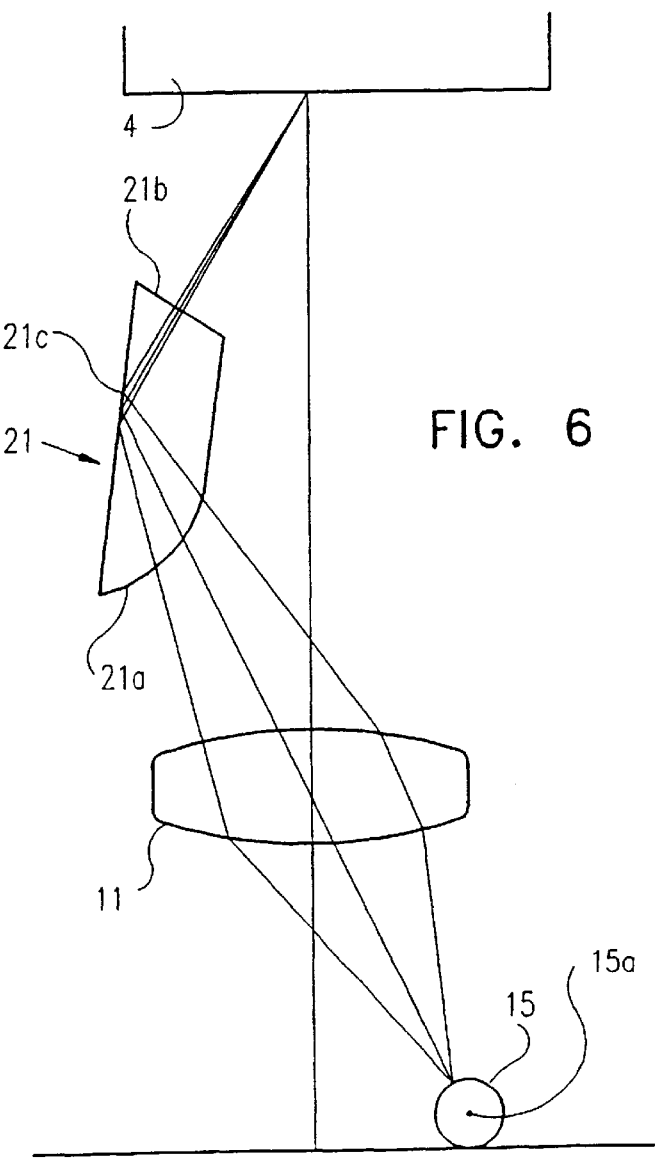
FIG. 6 is a diagram illustrating the optical path from the roller to the optical sensor including the lens-mirror member of FIG. 5.

Thus, as shown particularly in FIGS. 5 and 6, lens-mirror member 21 includes an incident face 21a facing the focusing lens 11, an exiting face 21b facing the CCD array 4, and a reflecting face 21c for receiving the incident light from face 21a and for reflecting it through face 21b to the CCD array 4. Face 21a receiving the incoming light reflected from the roller 15 via the focusing lens 11 is light-converging, i.e., convex, whereas the reflecting face 21c is planar. Face 21b is also planar but is inclined such as to be substantially perpendicular to the light received from the roller and reflected from face 21c. It will be appreciated that the same effect can be produced by making either face 21b or 21c, or both, light-converging.

Since the same CCD array 4 is used in the character detector system of light source 12 and the displacement detector system of light source 14, these two light sources are energized at different time periods to enable the data processor to distinguish between these two detector systems with respect to the output of the CCD array 4. For example both light sources may be energized at the same frequency, e.g., 500 Hz, but at different time periods; alternatively, light source 12 may be energized at a frequency of 500 Hz, whereas light source 14 may be energized at different time periods and at a higher frequency, e.g., 2 Khz. Preferably, both light sources are red LEDs, such that no filter is necessary, but could be of other types, e.g., infrared or ultraviolet, with or without filters.

Figure 7:
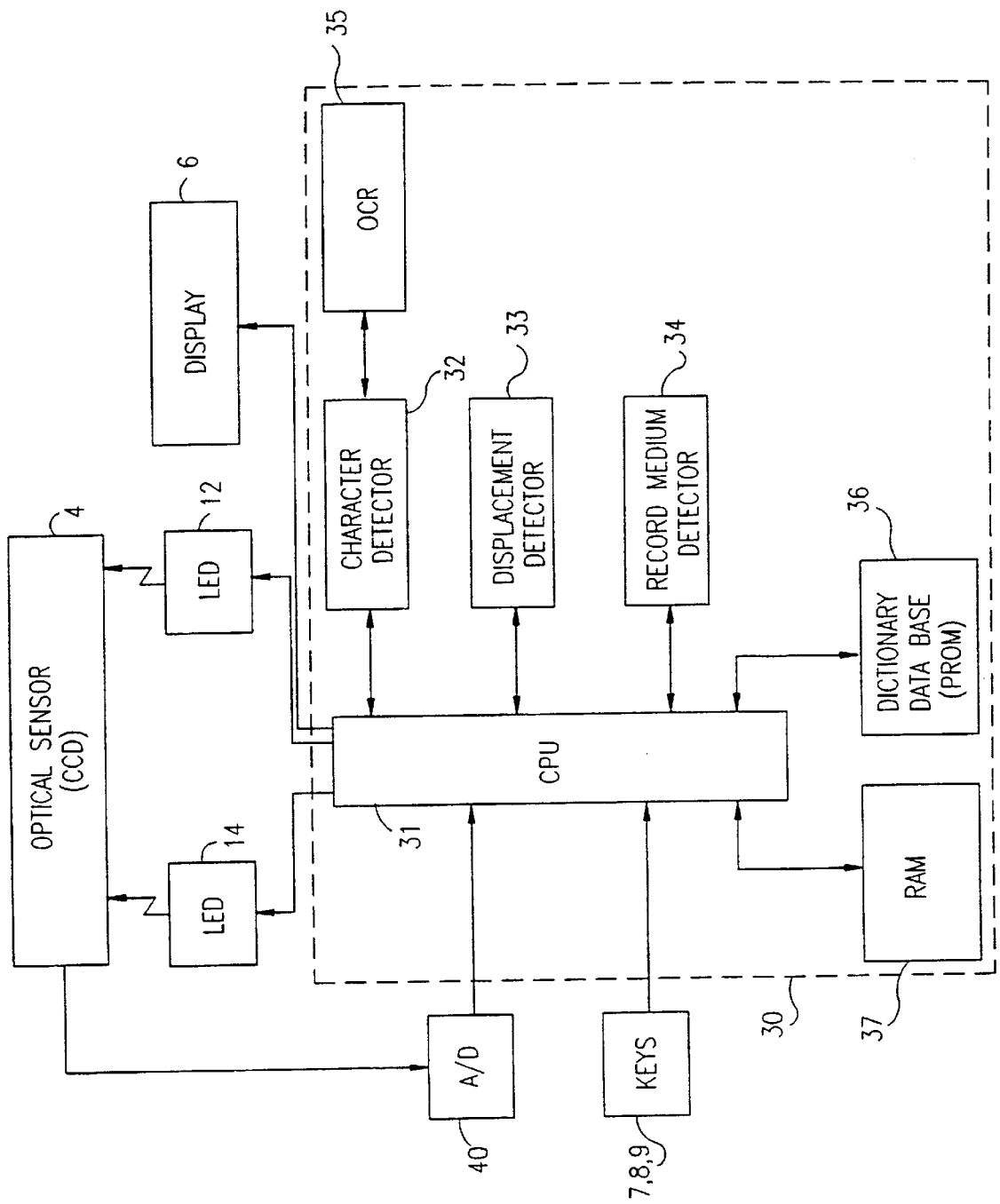
FIG. 7 is a block diagram illustrating the electrical construction of the optical scanner.

FIG. 7 is a block diagram illustrating the overall electrical system in the above-described electronic translator. The electrical system includes a digital signal processor 30 enclosed within housing 2, as schematically indicated by block 5 in FIG. 3. Processor 30 receives inputs from the CCD optical sensor 4 after conversion to digital form by an A/D converter 40.

Processor 30 includes a CPU 31 which controls the energization of the IR light source 12 used for character detection, and the visible light source 14 used for displacement detection. These light sources are energized at different intervals and at different frequencies. Thus, when the CPU 31 receives the output from the CCD array 4 as a result of energizing the IR light source 12, it processes the information in a character detector system 32; and when it receives the CCD array output as a result of energizing the visible light source 14, it processes the information in a displacement detector system 33. The light received by the CCD array output from light source 12 is also used in a record medium detector system 34 for detecting the record medium RM.

Processor 30 also includes an optical character recognition (OCR) system 35 receiving the information processed in the character detector system 32 for recognizing characters. It further includes a PROM storage device 36 for storing, in addition to its operational program, also a dictionary of words in one language and their translations in another language. It further includes a RAM storage device 37 for use during the normal operation of the electronic translator. While the character detector system 32, the displacement detector system 33, the record medium detector system 34, and the optical character recognition (OCR) system 35, are all shown as separate blocks in FIG. 7, it will be appreciated that they are actually logic units within the data processor system 30. The processor 30 also includes inputs from the control keys 7, 8, 9 illustrated in FIG. 1.

FIG. 8 illustrates a modification in the construction of the optical scanner, to provide an optical light guide for guiding the movements of the scanner over the record medium RM. For this purpose, the housing 2 is formed with an opening 50, and a mirror 51 is located within the housing for projecting light from light source 12 out through opening 50 laterally of the housing in the direction of movement of the scanner head over the record medium RM.

FIGS. 9 and 10 illustrate the optical scanner with another type of optical light guide, namely a transparent guide plate 52 fixed to the housing 2 and extending laterally thereof at the scanner head 3. Transparent guide plate 52 is of semi-circular configuration. It has a flat edge 52a, and a semi-circular outer edge 52b extending externally of the housing laterally of the scanner head 3 and formed with a cursor line 53 to guide the optical scanner over the record medium being scanned. Optionally, transparent guide plate 52 may be illuminated by a light source, shown at 12 in FIG. 9, within the housing.

FIG. 11 is a flow chart illustrating how the data processor 30 may be programmed to assure proper ambient light conditions, and also proper positioning of the scanner head 3 in contact with the record medium RM, before processing the output of the optical sensor.

Thus, as shown in FIG. 11, the data processor is programmed to first measure the output of the optical sensor 4 to determine whether the output is below a first predetermined threshold corresponding to acceptable stray light conditions (blocks 60–62). If the sensor output is above that threshold, this indicates that the scanner head may be pointed to a light source, a lit window, or the like, accounting for the excessive light received by the sensor.

If the sensor output is below the first predetermined threshold, the data processor then checks to determine whether the output is above a second predetermined threshold (blocks 64–68); if so, this indicates that the record medium is in proper contact with the scanner head (block 69), and therefore the data processor is enabled to process the character and position data outputted by the sensor (block 70).

The flow chart illustrated in FIG. 11 includes an optional further step that may be performed in case the record medium is black and the data is white (rather than the usual reverse), in which case the output of decision block 68 would be negative even when proper contact is made with the record medium. To anticipate this possibility, a check is made to determine whether the roller 15 has moved (block 80); if so, this indicates that the record medium and its characters are in the "negative print" form (block 81); in such case, the data processor 30 is enabled to process the character and position data (block 82), but the output of the sensor 4 is inverted, to thereby invert the BIT map (block 83) in view of this "negative print" condition of the record medium. In the present patent application the term "negative print" includes a text comprising "light characters" on a "dark background".

When the scanner head 3 is not in contact with a record medium, light source 12 (for data detection) may be pulsed at a lower rate (e.g., 20 Hz). Light source 14 (for position detection) may not be energized, or may be energized also at a very low rate for detecting "negative print" as described above with respect to FIG. 11.

When contact with the record medium is detected as described above, the two light sources may be energized at the higher frequency described above, e.g., light source at a frequency of 500 Hz and light source at a higher frequency of e.g., 2 Khz. The two light sources are energized at different time periods to enable the data processor to distinguish between the two detector systems with respect to the output of the CCD optical sensor 4.

The optical scanner may be operated such that the data processing is automatically initiated when the scanner head is lifted from the record medium.

In the case of a word which is split to two lines connected by a hyphen, the scanner can be instructed not to begin the translation when the word portion of the first line has been scanned, but to delay the translation until the word portion in the second line has been scanned. This may be done in a number of ways, including the following: (1) Enter key 7 (or another special key provided on the scanner) is to be depressed by the user and to thereby instruct the scanner to delay the translation until the word portion of the second line has been scanned; (2) the data processor recognizes the "hyphen" as an instruction not to begin the translation until the word in the next line has been scanned; or (3) the scanner is manually moved in the reverse direction to rescan, but reversibly, the scanned word of the first line, this rescanning being recognized as an instruction not to start the translation.

The accuracy of the scanner depends to a high degree on the accuracy of the helical lines 16 on the roller 15. It is therefore highly desirable to pre-calibrate the scanner for each roller. This may be done by energizing light source 14 to illuminate the roller. Since there is an overlap between the helical lines 16, the CCD image sensor sees at least two spots corresponding to the distance between the two helical lines in any position of the roller. The number of pixel elements may then be counted spanning the two spots to provide a measurement of the distance between the two helical lines. This procedure may be repeated a number of times, and the average taken to provide a precise measurement of the distance between the helical lines.

While the invention has been described with respect to several preferred embodiments, it will be appreciated that these are set forth merely for purposes of example, and that many other variations, modifications and applications of the invention may be made.

What is claimed is:

1. An optical scanner comprising a hand-holdable housing including:
    a scanner head for scanning a record medium;
    a roller engageable and rotated by said record medium when scanned by said scanner head, said roller including an optically-sensible marking for use in measuring the rotary movement of the roller;
    an illuminator for illuminating said record medium and roller including said marking thereon;
    an optical sensor for sensing information on the record medium and said marking on the roller and for producing an output corresponding thereto;
    a first optical system including a focusing lens for focusing light reflected from said record medium onto said optical sensor; and
    a second optical system for focusing light reflected from said roller onto said optical sensor,
    said second optical system including said focusing lens of the first optical system;
    said second optical system further including a lens-mirror member having:
        a first face facing said focusing lens for receiving light reflected by said roller;
        a second face facing said optical sensor for transmitting light exiting from said lens-mirror member to said optical sensor; and
        a third reflecting face for receiving the incoming light from said first face and for reflecting same through said second face to the optical sensor;
        at least one of the faces being light-converging to partially focus the received light such as to compensate for a shorter distance between the focal lens and the roller than between the focal lens and the record member.

2. The optical scanner according to claim 1, wherein said first face is the light-converging face, said reflecting face is planar, and said second face is also planar and is inclined so as to be substantially normal to the light received from said roller and reflected by said reflecting face through said second face.

3. The optical scanner according to either of claims 1 or 2, wherein said housing further includes a guide for guiding the movement of the scanner head over the record medium.

4. The optical scanner according to claim 3, wherein said guide comprises a light source located within said housing, and a mirror within said housing for projecting a beam of light laterally through an opening in the housing in the direction of movement of the scanner head to be moved over the record medium.

5. The optical scanner according to claim 3, wherein said guide further comprises a transparent guide member fixed to said housing and including a cursor line extending in the direction of the scanner head is to be moved over the record medium.

6. The optical scanner according to claim 5, wherein said guide includes a light source within the housing for illuminating the inner surface of said transparent guide member.

7. The optical scanner according to claim 1, wherein said illuminating means comprises:
    a first light source for illuminating said record medium;
    a second light source for illuminating said roller;
    and a control system for periodically energizing said first light source during predetermined times, and said second light source during other predetermined times, to enable said optical sensor to sense both the information on the record medium and the marking of the roller.

8. The optical scanner according to claim 1, wherein said optical scanner includes a linear array of optical sensor elements extending parallel to the rotary axis of said roller, and said optically-sensible marking includes at least one line extending helically on the outer face of said roller.

9. The optical scanner according to claim 8, wherein said roller includes at least one reference line extending around the circumference of the roller at the opposite ends of said helical line.

10. The optical scanner according to claim 1, wherein said housing further includes electrical circuitry programmed to first check the output of the optical sensor when the scanner head is out of contact with the record medium to assure the output is below a first predetermined threshold, and then to check the output of the optical scanner when the scanner head is in contact with the record medium to assure that the output is above a second predetermined threshold, before the electrical circuitry processes the output of said optical sensor.

* * * * *